(No Model.) 3 Sheets—Sheet 2.
E. G. STAUDE.
MOWING MACHINE.
No. 546,200. Patented Sept. 10, 1895.
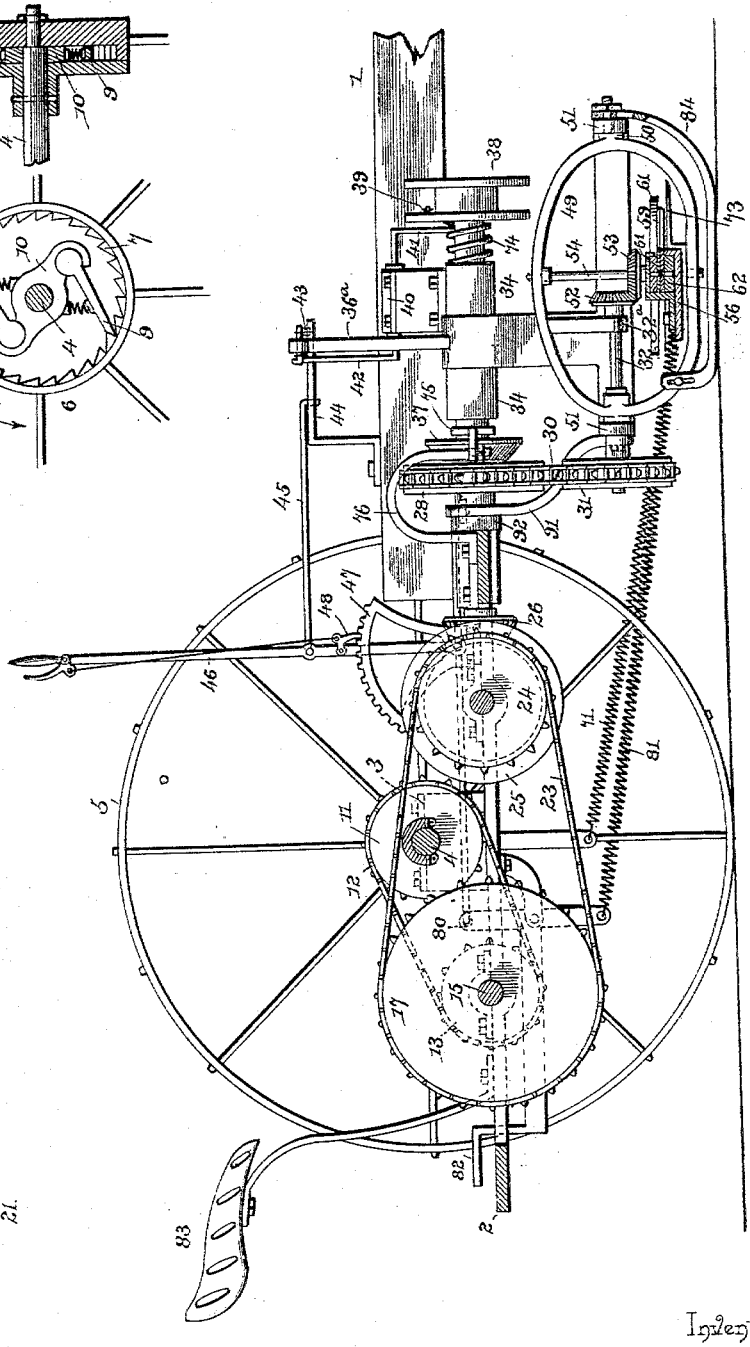
Witnesses
Jas. K. McCathran
Inventor
Edwin G. Staude
By his Attorneys.
C.A.Snow & Co.

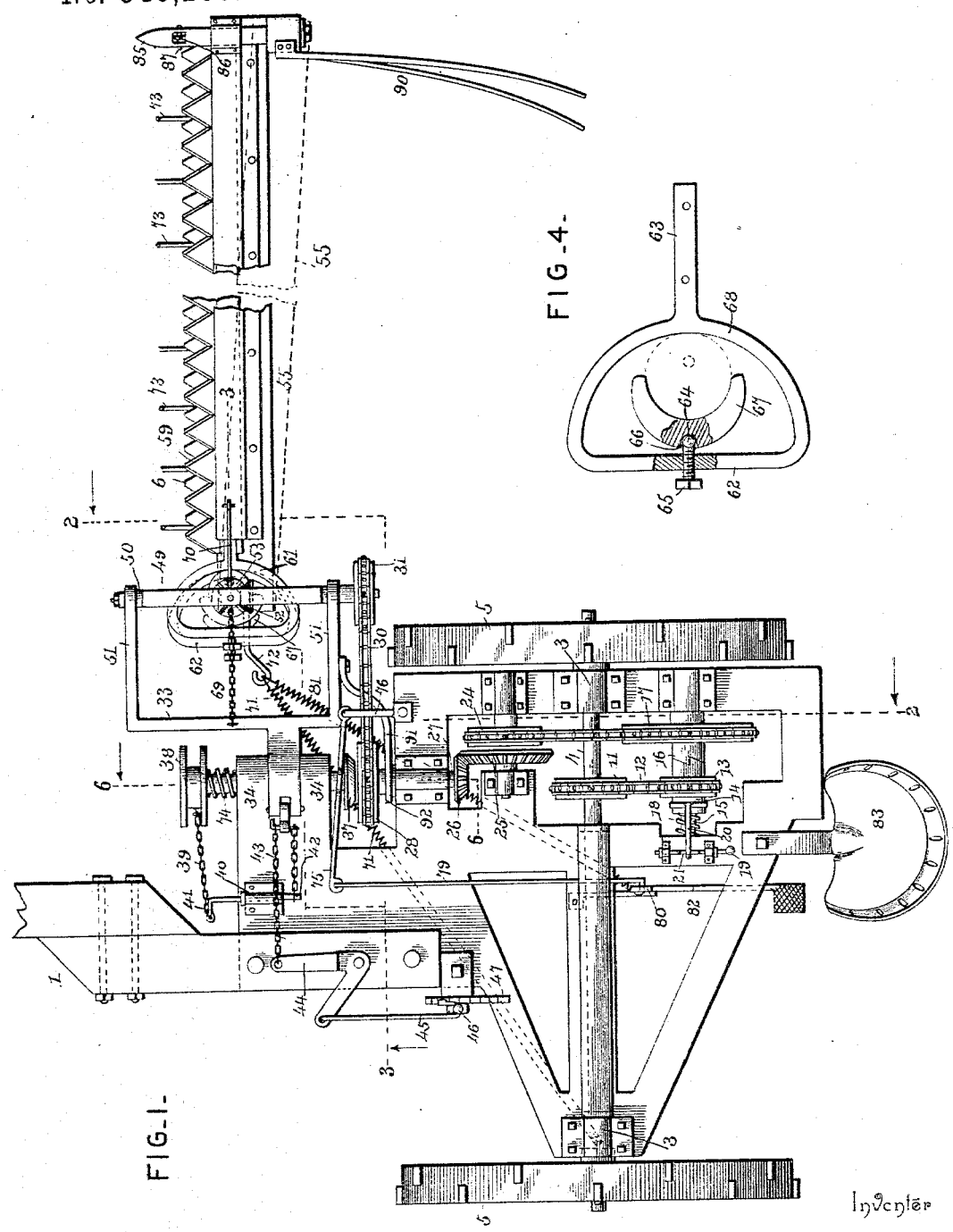

(No Model.)   3 Sheets—Sheet 3.
E. G. STAUDE.
MOWING MACHINE.
No. 546,200.   Patented Sept. 10, 1895.
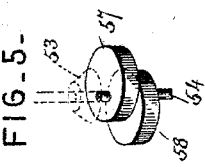
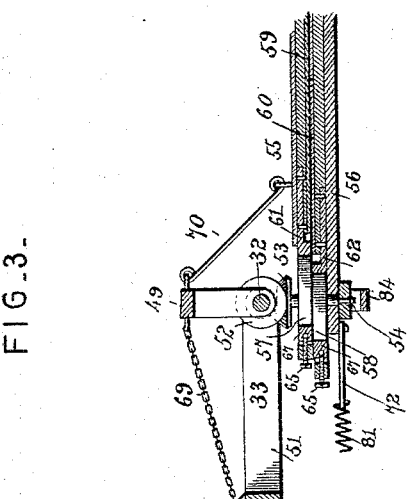
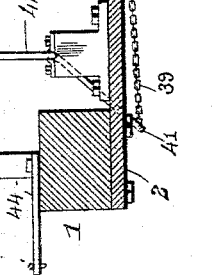
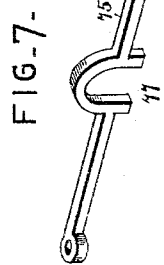
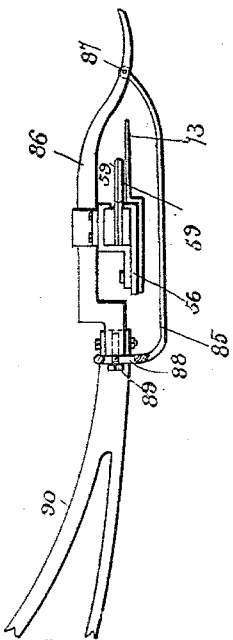
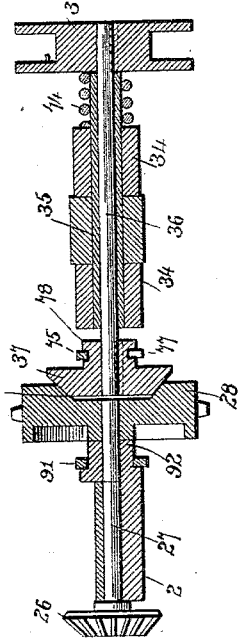
Witnesses
Jas. K. McCuthran
Inventor
Edwin G. Staude
By his Attorneys
C A Snow & Co.

UNITED STATES PATENT OFFICE.

EDWIN G. STAUDE, OF KEMPTON, NORTH DAKOTA.

MOWING-MACHINE.

SPECIFICATION forming part of Letters Patent No. 546,200, dated September 10, 1895.

Application filed December 14, 1894. Serial No. 531,830. (No model.)

*To all whom it may concern:*

Be it known that I, EDWIN G. STAUDE, a citizen of the United States, residing at Kempton, in the county of Grand Forks and State of North Dakota, have invented a new and useful Mowing-Machine, of which the following is a specification.

My invention relates to mowing-machines and to cutting apparatus for reapers and harvesters, and the objects in view are to provide means whereby the cutting apparatus of a machine of the class mentioned is allowed to yield upon encountering an obstacle, and in addition to swinging backward will be elevated sufficiently to pass over the obstruction and finally descend to its normal position when the obstacle has been passed, and, furthermore, to improve the general construction and arrangement of the parts of the machine to render the same more positive and efficient in its operation.

Further objects and advantages of the invention will appear in the following description, and the novel features thereof will be particularly pointed out in the appended claims.

In the drawings, Figure 1 is a plan view of a machine embodying my invention. Fig. 2 is a side view, partly in section, on the line 2 2 of Fig. 1. Fig. 3 is a transverse section on the line 3 3 of Fig. 1. Fig. 4 is a detail view partly broken away of one of the eccentric-yokes. Fig. 5 is a detail view of the eccentrics. Fig. 6 is a detail section of the drum and the contiguous parts on the line 6 6 of Fig. 1. Fig. 7 is a detail view in perspective of the lever for communicating motion to the friction-block. Fig. 8 is a detail view of the outer shoe and guard for the finger-bar. Fig. 9 is a detail view in perspective of the shifting-lever for throwing the machine in and out of gear. Fig. 10 is a detail view of one of the clutches for connecting the ground-wheels to the main shaft. Fig. 11 is a detail section of the same.

Similar numerals of reference indicate corresponding parts in all the figures of the drawings.

The tongue 1 is secured to the front portion of the frame 2, in bearings 3 of which is mounted a transverse driving or main shaft 4. The ground-wheels 5 are mounted loosely on the extremities of this shaft and are connected to communicate rotary motion thereto by means of clutches 6. The clutch which I have shown in the drawings consists of a ratchet 7, preferably arranged in the hollow hub 8 of the ground-wheel, and spring-actuated pawls 9, which are pivotally mounted in a cross-head 10 on the shaft, whereby forward rotation of the wheel is communicated to the shaft, while backward rotation thereof causes the ratchet-teeth to slip idly over the pawls. The direction of forward rotation is indicated by the arrow in Fig. 10.

Fixed to the main shaft is a chain-gear 11, which is connected by means of a chain 12 with a gear 13, carried by a clutch member 14. This clutch member is mounted to slide upon a countershaft 15, the face of said clutch member being in operative relation with a similar face on the clutch member 16, which is mounted upon the shaft and carries a large chain-gear 17, said clutch member 16 forming a part of the hub of said gear 17. The clutch-faces are normally held in engagement to communicate motion from the gear 13 to the gear 17 by means of a spring 18, and a shifting-lever 19 is connected by means of a rod 20 with the clutch member 14, whereby the clutch-faces may be disengaged to prevent the communication of motion from the clutch member 14 to the clutch member 16. The shifting-lever 19 is provided with a crank-shaft 21 for attachment to one end of the connecting-rod 20, and the other end of said connecting-rod 21 is provided with a fork 22 to engage the clutch member 14 without preventing rotary motion thereof. A chain 23 communicates motion from the chain-gear 17 to the chain-gear 24, which is fixed to the spindle of a beveled gear 25, and meshing with this beveled gear is a beveled pinion 26, fixed to a longitudinally-disposed shaft 27.

Fixed to the shaft 27 is a chain-gear 28, also forming one member of a friction-clutch and being provided in one side, as shown clearly in Fig. 6, with a conical cavity 29, and this chain-gear 28 is connected by means of a chain 30 with a chain-wheel 31, fixed to a short shaft 32, mounted in bearings on the pivotal spider-frame 33. This spider-frame is pivoted between ears 34 of the main frame upon a tubular spindle 35, which is arranged in registering-eyes formed in said ears 34, and the spider-frame is provided with an upright arm 36ª, whereby the frame may be elevated at its outer end upon the spindle 35 as a center. Mounted to slide and rotate in the tubular spindle is a core 36, to the rear end of which is keyed a friction-block 37, forming the other member of the above-mentioned friction-clutch and being conical to fit in the conical cavity 29 in the gear 28, and fixed to the other end of said core is a drum 38, to which is attached a chain 39, connected to a lever 40. This lever 40, in addition to the arm 41 to which the chain 39 is attached, is provided with an upper arm 42, which is connected to the upper end of the arm 36ª of the spider-frame, and therefore when the friction-block 37 is brought into frictional contact with the other member of the clutch, thus communicating rotary motion to the core 36, the drum 38 rotates in the direction of the arrow indicated in Fig. 3, winds the chain 39 thereon, operates the lever 40, and elevates the outer end of the spider-frame. Also connected to the upper end of the arm 36ª by means of a chain 43 is a bell-crank lever 44, and the other arm of this lever is connected by a rod 45 with a hand-lever 46, operating in connection with a segment 47 and provided with a pawl 48 to engage the teeth of the segment. By means of this lever the outer end of the spider-frame may be elevated without employing the friction-clutch drum and co-operating parts.

Mounted in the spider-frame is a swiveled frame 49, provided with front and rear trunnions 50, which are mounted in bearings at the extremities of the front and rear arms 51 of said spider-frame. The rear trunnion of the swiveled frame is hollow and therethrough passes the shaft 32, which carries the chain-gear 31. The front end of the shaft 32 is mounted in a bearing formed in the bracket 32ª, and is fitted with a beveled gear 52, which meshes with a similar gear 53 on the vertical spindle 54, mounted in the upper and lower sides of the swiveled frame, and swiveled upon the spindle 54 is the finger-bar 55, whereby the free or outer end of the latter may swing to the rear when an obstacle is encountered, the spindle 54 serving as the center.

Fixed to the spindle 54, above the plane of the body portion 56 of the finger-bar 55, are the oppositely-disposed eccentrics 57 and 58, and fixed to the inner ends of the upper and lower sickle-bars 59 and 60 are the eccentric-yokes 61 and 62, one of which is shown in detail in Fig. 4. The stem 63 of a yoke is secured to its sickle-bar by means of rivets or similar devices and the outer side of the yoke is segmental or arc-shaped and is concentric with a ball 64 on the extremity of an adjusting-screw 65, threaded in an opening in the inner side of the yoke. Mounted pivotally upon the inner extremity of said adjusting-screw by means of a socket 66, which receives the ball 64, is an oscillatory seat 67, which receives the eccentric, as indicated in dotted lines in Fig. 4. The outer side of the eccentric is held in contact with the inner surface of the segmental or arc-shaped side 68 of the yoke, and the lateral motion of the eccentric or the motion parallel with the direction of movement of the machine affects the oscillatory seat 67 only and is not communicated to the yoke. Therefore the sickle-bar receives positive reciprocatory motion without lateral strain. The swiveled frame is held in its normal position by means of a limiting-chain 69, by which the upper side of said frame is connected to the inner side of the spider-frame, and the finger-bar is connected to the upper side of the swiveled frame by means of a brace 70 to prevent straining the spindle 54 when the spider-frame is elevated to similarly actuate the finger-bar. A return-spring 71 connects a finger 72 on the inner end of the finger-bar with a fixed part of the main framework, and the finger-bar is provided with forwardly-projecting guards 73, which are designed to strike a stone or other obstacle and repress the finger-bar against the tension of the spring 71. When the finger-bar is released by passing said obstacle it is returned to its normal position by means of the spring 71.

To cause the elevation of the finger-bar when it is repressed by contact with an obstacle without operating the hand-lever is the function of the mechanism hereinbefore described, including the friction-clutch, drum, and lever 40, and in order that the friction-clutch, the members of which are normally held separated by the spring 74, may be operated at the moment of repressing the finger-bar, I employ a lever 75, (shown in detail in Fig. 7,) the same being pivoted at one end to a bracket 76, and having an intermediate strap 77, which engages a channel 78 in the hub of the block 37. This lever is connected at its free end by means of a rod 79 with a pivotal cross-head 80, and to the other end of this cross-head is attached one end of a flexible connection 81 extending from the finger 72 at the inner end of the finger-bar, said flexible connection in the construction illustrated consisting of a coiled spring. Attached to the cross-head 80 is a foot-lever 82, the rear end of which is arranged within convenient reach of the driver's seat 83.

Attached at its rear end to the swiveled frame 49 and connected at its front end to the front arm of the spider-frame 33 is an inner shoe 84, and arranged at the outer end of the finger-bar is the shoe 85, connected to the finger-bar by means of a divider-frame 86, to which the shoe is pivoted at 87. The rear end of said shoe is provided with a slot 88 for the reception of a set-screw 89 at the rear end of the divider-frame, whereby the inclination of the shoe may be adjusted. Attached to the rear end of the divider-frame is a track-clearer 90.

This being the construction of the apparatus, the operation thereof is as follows: When the fingers 73, which project in front of the sickle-bars, encounter a stone, sand-heap, or other obstacle, the cutting mechanism is repressed against the tension of the spring 71, thereby straining the connection 81, advancing the lower end of the cross-head 80, and moving the free end of the lever 75 toward the rear. This brings the friction-block 37 into contact with the other member of the friction-clutch and thereby causes the transmission of motion from the gear 28 to the spindle 36. The drum then winds the chain 39 and draws the arm 36ª of the spider-frame in the direction indicated by the arrow in Fig. 3, thus elevating the outer end of said frame. From this it will be seen that as soon as rearward motion is imparted to the finger-bar an upward movement is caused by the mechanism provided for that purpose, thus elevating the cutting mechanism over the obstacle. When the rearward pressure upon the finger 73 is removed, the cutting mechanism swings back to its normal position, the strain on the connection 81 is relieved, and the spring 74 withdraws the friction-block out of contact with the other member of the friction-clutch and allows the drum to unreel the chain 39 and release the spider-frame.
This release of the spider-frame is accomplished as soon as the pressure against the finger 73 is relieved, and hence the finger-bar returns to its normal or operative position as soon as the obstacle has been passed.
The arrangement of the operating connections for communicating motion to the sickle-bars is such as to allow swinging and vertical movement of the finger-bar without cramping any of the parts. The swiveled frame provides for any vertical movement of the cutting apparatus which may be caused by inequalities in the surface traversed, and in order to prevent straining of the spider-frame a brace 91 is attached to the rear arm thereof and is swiveled upon a boss 92 on the main frame, concentric with the shaft 27.

Various changes in the form, proportion, and the minor details of construction may be resorted to without departing from the spirit or sacrificing any of the advantages of this invention. For instance, a single sickle-bar used in connection with guard-fingers may be employed in lieu of the oppositely-reciprocated sickle-bars shown in the drawings, in which case one of the eccentrics would be omitted and sufficient throw would be given to the remaining eccentric to give the desired motion to the sickle-bar.

Having described my invention, I claim—

1. The combination with a framework and ground-wheels, of a cutting apparatus pivoted to swing backward in a horizontal plane, a pivotal frame supporting the cutting apparatus, whereby the latter may be elevated, a drum operatively connected with said pivotal frame, a clutch having one of its members operatively connected with the ground-wheels and the other member secured to the spindle of the drum, and means controlled by the cutting apparatus for operating one member of the clutch to throw the members into and out of engagement, substantially as specified.

2. The combination with a framework and ground-wheels, of a spider frame pivotally mounted upon the framework, cutting apparatus having a pivotal finger-bar carried by the spider frame and adapted to swing horizontally rearward, a drum, connections between the drum and the spider-frame whereby the outer end of the latter with the finger-bar may be elevated, a clutch having one member operatively connected with the ground-wheels, and the other member fixed to the spindle of the drum, a lever connected with one member of the clutch to throw the same into and out of engagement with the other member, a pivotal cross-head having one arm connected with said lever, and a yielding connection between the other arm of the cross-head and the finger-bar, whereby when the finger-bar is swung rearwardly the said lever is operated to cause the engagement of the clutch members, substantially as specified.

3. The combination with a framework and ground-wheels, of a pivotal spider frame, cutting apparatus having a finger-bar carried by the spider frame and mounted to swing horizontally rearward, a drum, connections between the drum and spider frame whereby the outer end of the latter with the finger-bar may be elevated when the drum is rotated, a contractile spring for holding the finger-bar normally in operative position, a clutch having one member operatively connected with the ground-wheels and the other member operatively connected with the drum, a lever connected to one of the members of the clutch and adapted to throw the members into and out of engagement, a pivotal cross head having one arm connected with said lever, and a contractile connection between the other arm of the cross-head and the finger-bar whereby when the finger-bar is repressed horizontally the lever is operated to throw the clutch members into engagement and communicate motion to the drum, substantially as specified.

4. The combination with a supporting framework and ground-wheels, of a spider frame pivotally mounted upon the framework, cutting apparatus having a finger-bar carried by the spider-frame and mounted to swing horizontally rearward, yielding means for holding the finger-bar in its operative position, a drum having its core mounted to slide longitudinally, connections between the drum and the spider-frame, whereby when the drum is rotated said frame and finger-bar are elevated, a friction clutch having one member operatively connected with the ground-wheels and the other member fixed to the spindle of the drum, a spring for holding the drum spindle in position to maintain the clutch member carried thereby out of engagement with the other clutch member, and connections between the finger-bar and the drum spindle whereby when the former is repressed the clutch members are thrown into engagement, substantially as specified.

5. The combination with a supporting framework and ground-wheels, of a pivotal spider-frame having front and rear arms, a swiveled frame mounted in the spider-frame, a vertical spindle mounted in the swiveled frame, cutting apparatus having a finger-bar fulcrumed upon said spindle, driving connections between the spindle and the ground-wheels, means for communicating motion from the spindle to the knives of the cutting apparatus, a flexible limiting device connecting the swiveled frame to the spider-frame for limiting the downward movement of the finger-bar, resilient means for holding the cutting apparatus in its normal position and means for elevating the outer end of the spider-frame and the finger-bar, substantially as specified.

6. The combination with a supporting framework and ground-wheels, of a pivotal spider-frame, a swiveled frame mounted upon the spider-frame, a vertical spindle mounted in the swiveled frame, a horizontal shaft connected by gearing with said spindle, operating connections between said shaft and the ground-wheels, cutting mechanism having a finger-bar swiveled upon the spindle and including a sickle or knife, resilient means for holding the apparatus in operative position, an eccentric on said spindle, an eccentric yoke embracing the eccentric and connected to the sickle or knife, and means for elevating the spider-frame and finger-bar, substantially as specified.

7. The combination with a supporting framework and ground-wheels, of a pivotal spider-frame, a swiveled frame mounted upon the spider-frame, a vertical spindle mounted in the swiveled frame, operating connections between said spindle and the ground-wheels, an eccentric carried by said spindle, a yoke attached to a knife or sickle forming a part of the cutting apparatus, said yoke having an oscillatory seat mounted for pivotal movement by means of an adjusting screw carrying a ball which engages a socket in said seat, the portion of the yoke adjacent to the open side of said seat being concentric with the pivotal point of the seat, and means for elevating the outer end of the spider-frame and the finger-bar, substantially as specified.

8. The combination with a supporting framework and ground-wheels, of a pivotal spider-frame having parallel front and rear arms, an elliptical swiveled frame having front and rear trunnions mounted in bearings in the arms of the spider-frame, a spindle mounted in bearings in the upper and lower sides of the swiveled frame, a shaft mounted concentric with the trunnions of the swiveled frame and connected by gearing with the spindle, a finger-bar swiveled to the said spindle, upper and lower parallel knives or sickles, eccentrics carried by the spindle, connections between the eccentrics and said knives or sickles, a limiting-chain connecting the upper side of the swiveled frame to the spider frame, a finger attached to the finger-bar and projecting inward beyond the fulcrum point thereof, a return-spring connected to said finger to hold the finger-bar in its operative position, connections between the said shaft and ground-wheels, and means for elevating the outer end of the spider-frame and the finger-bar, substantially as specified.

9. The combination with a supporting framework and ground-wheels of a pivotal spider-frame, a tubular shaft forming the fulcrum of said frame, a core mounted to slide in said tubular-shaft, a pivotal finger-bar mounted upon and carried by the spider-frame, said finger-bar being capable of universal movement, a shaft 32 operatively connected with the knives or sickles, a gear operatively connected with the ground-wheels and mounted co-axially with said core, said gear being provided in one side with a cavity, a friction-block fixed to the core and adapted to engage the cavity in the said gear, operating connections between said gear and the shaft 32, a drum fixed to the core, a lever having one arm connected to an arm of the spider-frame, a flexible connection between the drum and the other arm of said lever, and means for throwing the friction-block into and out of engagement with the cavity of the gear, substantially as specified.

In testimony that I claim the foregoing as my own I have hereto affixed my signature in the presence of two witnesses.

EDWIN G. STAUDE.

Witnesses:
JOHN O. FADDEN,
C. B. THOMAS.